United States Patent
Otsuka

(10) Patent No.: US 12,118,691 B2
(45) Date of Patent: Oct. 15, 2024

(54) IMAGE TRANSMISSION/RECEPTION SYSTEM, IMAGE TRANSMISSION APPARATUS, IMAGE RECEPTION APPARATUS, IMAGE TRANSMISSION/RECEPTION METHOD, AND PROGRAM

(71) Applicant: Sony Interactive Entertainment Inc., Tokyo (JP)

(72) Inventor: Katsushi Otsuka, Aichi (JP)

(73) Assignee: Sony Interactive Entertainment Inc., Tokyo (JP)

(*) Notice: Subject to any disclaimer, the term of this patent is extended or adjusted under 35 U.S.C. 154(b) by 64 days.

(21) Appl. No.: 17/431,609

(22) PCT Filed: Dec. 25, 2019

(86) PCT No.: PCT/JP2019/050908
§ 371 (c)(1),
(2) Date: Aug. 17, 2021

(87) PCT Pub. No.: WO2020/179205
PCT Pub. Date: Sep. 10, 2020

(65) Prior Publication Data
US 2022/0076378 A1 Mar. 10, 2022

(30) Foreign Application Priority Data

Mar. 1, 2019 (JP) .................................. 2019-037907
Apr. 26, 2019 (JP) .................................. 2019-086286

(51) Int. Cl.
*G06T 3/4053* (2024.01)
*A63F 13/355* (2014.01)
(Continued)

(52) U.S. Cl.
CPC .......... *G06T 3/4053* (2013.01); *A63F 13/355* (2014.09); *A63F 13/52* (2014.09); *G06T 3/4046* (2013.01); *G06T 9/00* (2013.01)

(58) Field of Classification Search
None
See application file for complete search history.

(56) References Cited

U.S. PATENT DOCUMENTS 8,358,868 B2   1/2013   Iketani
9,542,725 B2   1/2017   Shibata
(Continued)

FOREIGN PATENT DOCUMENTS

JP   2016062524 A   4/2016
WO   2009081529 A1   7/2009
WO   2014083857 A1   6/2014

OTHER PUBLICATIONS

Decision to Grant a Patent for corresponding JP Application No. 2021-503430, 4 pages, dated Jun. 29, 2022.
(Continued)

*Primary Examiner* — Aaron M Richer
(74) *Attorney, Agent, or Firm* — Matthew B. Dernier, Esq.

(57) ABSTRACT

An image transmission/reception system, an image transmission apparatus, an image reception apparatus, an image transmission/reception method, and a program, generate, from image data representing a downscaled image, a higher resolution image than the downscaled image and is more similar to an original image. An encoding process section generates image data representing a downscaled image obtained by downscaling the original image. An additional data generation section generates additional data on the basis of the original image, the additional data being unidentifiable by the image data alone. A data transmission section transmits the image data and the additional data. A data (Continued)

reception section receives the image data and the additional data. An upscaling section generates an upscaled image on the basis of the image data and the additional data, the upscaled image being higher in resolution than the downscaled image. A display control section causes the upscaled image to be displayed.

11 Claims, 10 Drawing Sheets

(51) Int. Cl.
*A63F 13/52* (2014.01)
*G06T 3/4046* (2024.01)
*G06T 9/00* (2006.01)

(56) References Cited

U.S. PATENT DOCUMENTS

| | | |
|---|---|---|
| 2010/0278422 A1 | 11/2010 | Iketani |
| 2014/0177706 A1* | 6/2014 | Fernandes .............. H04N 19/59 375/240.03 |
| 2015/0317767 A1 | 11/2015 | Shibata |
| 2016/0086311 A1* | 3/2016 | Maehara .................. G06T 5/50 382/299 |
| 2016/0217552 A1* | 7/2016 | Yang ......................... G06T 7/90 |
| 2018/0183998 A1* | 6/2018 | Menachem ............ H04N 5/341 |
| 2018/0261307 A1* | 9/2018 | Couse .................... G16H 80/00 |
| 2019/0166379 A1* | 5/2019 | Navarrete Michelini ................... G06T 3/4046 |
| 2020/0045348 A1* | 2/2020 | Boyce ................. H04N 21/435 |
| 2021/0211643 A1* | 7/2021 | Da Silva Pratas Gabriel ............ G06T 3/4046 |

OTHER PUBLICATIONS

International Search Report for corresponding PCT Application No. PCT/JP2019/050908, 4 pages, dated Mar. 17, 2019.

* cited by examiner

IMAGE TRANSMISSION/RECEPTION SYSTEM, IMAGE TRANSMISSION APPARATUS, IMAGE RECEPTION APPARATUS, IMAGE TRANSMISSION/RECEPTION METHOD, AND PROGRAM

TECHNICAL FIELD

The present invention relates to an image transmission/reception system, an image transmission apparatus, an image reception apparatus, an image transmission/reception method, and a program.

BACKGROUND ART

The technology for a cloud gaming service, which has been attracting attention recently, involves using terminals capable of communicating with a cloud server executing game programs. When a user playing a game on such a terminal performs an operation, an operation signal reflecting the operation is transmitted from the terminal to the cloud server. Then, the cloud server executes game processing including, for example, processing corresponding to the operation signal, thereby generating a play image representing the play status of the game. The play image is transmitted from the cloud server to the terminal and is then displayed on the terminal.

SUMMARY

Technical Problem

The inventors have studied ways to enable the cloud server to transmit, to the terminal, image data representing an image downscaled from an image generated by the cloud server, thus reducing the traffic between the cloud server and the terminal. In the following description, an image generated by the cloud server will be referred to as an original image, and an image downscaled from the original image will be referred to as a downscaled image.

In the above case, an image that is similar to the original image which has been generated by the cloud server and that is higher in resolution than the downscaled image (for example, an image having the substantially same resolution as that of the original image) should preferably be displayed on the terminal. Here, the terminal receiving the image data may conceivably generate an image similar to the original image by use of a super-resolution technology, for example, on the basis of the received image data.

However, there have been cases where the image generated as described above solely on the basis of the image data representing the downscaled image is not quite similar to the original image.

It is to be noted that the above dissimilarities are generally caused not only in a situation where the cloud gaming service is provided, but also in a situation where the image downscaled from the original image is transmitted from an image transmission apparatus corresponding to the above-mentioned cloud server and is received by an image reception apparatus corresponding to the above-mentioned terminal.

The present invention has been made in view of the above circumstances. An object of the present invention is therefore to provide an image transmission/reception system, an image transmission apparatus, an image reception apparatus, an image transmission/reception method, and a program that generate an image from image data representing a downscaled image, in such a manner that the generated image is higher in resolution than the downscaled image and is more similar to the original image.

Solution to Problem

In order to solve the above problem, according to the present invention, there is provided an image transmission/reception system including an image transmission apparatus and an image reception apparatus. The image transmission apparatus includes an image data generation section configured to generate image data representing a downscaled image obtained by downscaling an original image; an additional data generation section configured to generate additional data on the basis of the original image, the additional data being unidentifiable by the image data alone; and a data transmission section configured to transmit the image data and the additional data. The image reception apparatus includes a data reception section configured to receive the image data and the additional data; an upscaling section configured to generate an upscaled image on the basis of the image data and the additional data, the upscaled image being higher in resolution than the downscaled image; and a display control section configured to cause the upscaled image to be displayed.

In one mode of the present invention, the additional data generation section includes a feature quantity data generation section configured to generate feature quantity data indicative of at least either a feature quantity of the original image or a feature quantity that is a parameter used for encoding the downscaled image. The data transmission section transmits the additional data including the feature quantity data. The upscaling section generates the upscaled image on the basis of the image data and the feature quantity data.

Alternatively, the additional data generation section includes a feature quantity data generation section and a super-resolution processing method data generation section, the feature quantity data generation section being configured to generate feature quantity data indicative of at least either a feature quantity of the original image or a feature quantity that is a parameter used for encoding the downscaled image, the super-resolution processing method data generation section being configured to generate super-resolution processing method data including a parameter for use in super-resolution processing on the basis of the feature quantity data. The data transmission section transmits the additional data including the super-resolution processing method data. The upscaling section generates the upscaled image on the basis of the image data and the super-resolution processing method data.

In the above mode, the upscaling section may include a trained machine learning model configured to output the upscaled image upon receiving, as input, the super-resolution processing method data and an image generated on the basis of the image data.

Preferably, the feature quantity data may include data indicative of at least one of a feature point of the original image, an edge strength of the original image, a depth of each pixel included in the original image, a texture type of the original image, an optical flow of the original image, and information representing a direction and a velocity in which and at which a rectangular region in the image moves.

In one mode of the present invention, the data transmission section transmits, to the image reception apparatus, the additional data with higher priority than the image data.

In one mode of the present invention, the upscaling section generates the upscaled image on the basis of a time series of the image data and a time series of the additional data, the upscaled image being higher in resolution than the downscaled image.

Further, according to the present invention, there is provide an image transmission apparatus including an image data generation section configured to generate image data representing a downscaled image obtained by downscaling an original image; an additional data generation section configured to generate additional data on the basis of the original image, the additional data being unidentifiable by the image data alone; and a data transmission section configured to transmit the image data and the additional data to an image reception apparatus including an upscaling section and a display control section, the upscaling section being configured to generate an upscaled image on the basis of the image data and the additional data, the upscaled image being higher in resolution than the downscaled image, the display control section being configured to cause the upscaled image to be displayed.

Further, according to the present invention, there is provided an image reception apparatus including a data reception section configured to receive image data and additional data from an image transmission apparatus including an image data generation section, an additional data generation section, and a data transmission section, the image data generation section being configured to generate the image data representing a downscaled image obtained by downscaling an original image, the additional data generation section being configured to generate the additional data on the basis of the original image, the additional data being unidentifiable by the image data alone, the data transmission section being configured to transmit the image data and the additional data; an upscaling section configured to generate an upscaled image on the basis of the image data and the additional data, the upscaled image being higher in resolution than the downscaled image; and a display control section configured to cause the upscaled image to be displayed.

Further, according to the present invention, there is provided an image transmission/reception method including a step of causing an image transmission apparatus to generate image data representing a downscaled image obtained by downscaling an original image; a step of causing the image transmission apparatus to generate additional data on the basis of the original image, the additional data being unidentifiable by the image data alone; a step of causing the image transmission apparatus to transmit the image data and the additional data; a step of causing an image reception apparatus to receive the image data and the additional data; a step of causing the image reception apparatus to generate an upscaled image on the basis of the image data and the additional data, the upscaled image being higher in resolution than the downscaled image; and a step of causing the image reception apparatus to cause the upscaled image to be displayed.

Further, according to the present invention, there is provided a program causing a computer to perform a step of generating image data representing a downscaled image obtained by downscaling an original image; a step of generating additional data on the basis of the original image, the additional data being unidentifiable by the image data alone; and a step of transmitting the image data and the additional data to an image reception apparatus including an upscaling section and a display control section, the upscaling section being configured to generate an upscaled image on the basis of the image data and the additional data, the upscaled image being higher in resolution than the downscaled image, the display control section being configured to cause the upscaled image to be displayed.

Further, according to the present invention, there is provided another program causing a computer to perform a step of receiving image data and additional data from an image transmission apparatus including an image data generation section, an additional data generation section, and a data transmission section, the image data generation section being configured to generate the image data representing a downscaled image obtained by downscaling an original image, the additional data generation section being configured to generate the additional data on the basis of the original image, the additional data being unidentifiable by the image data alone, the data transmission section being configured to transmit the image data and the additional data; a step of generating an upscaled image on the basis of the image data and the additional data, the upscaled image being higher in resolution than the downscaled image; and a step of causing the upscaled image to be displayed.

DESCRIPTION OF EMBODIMENT

Figure 1:
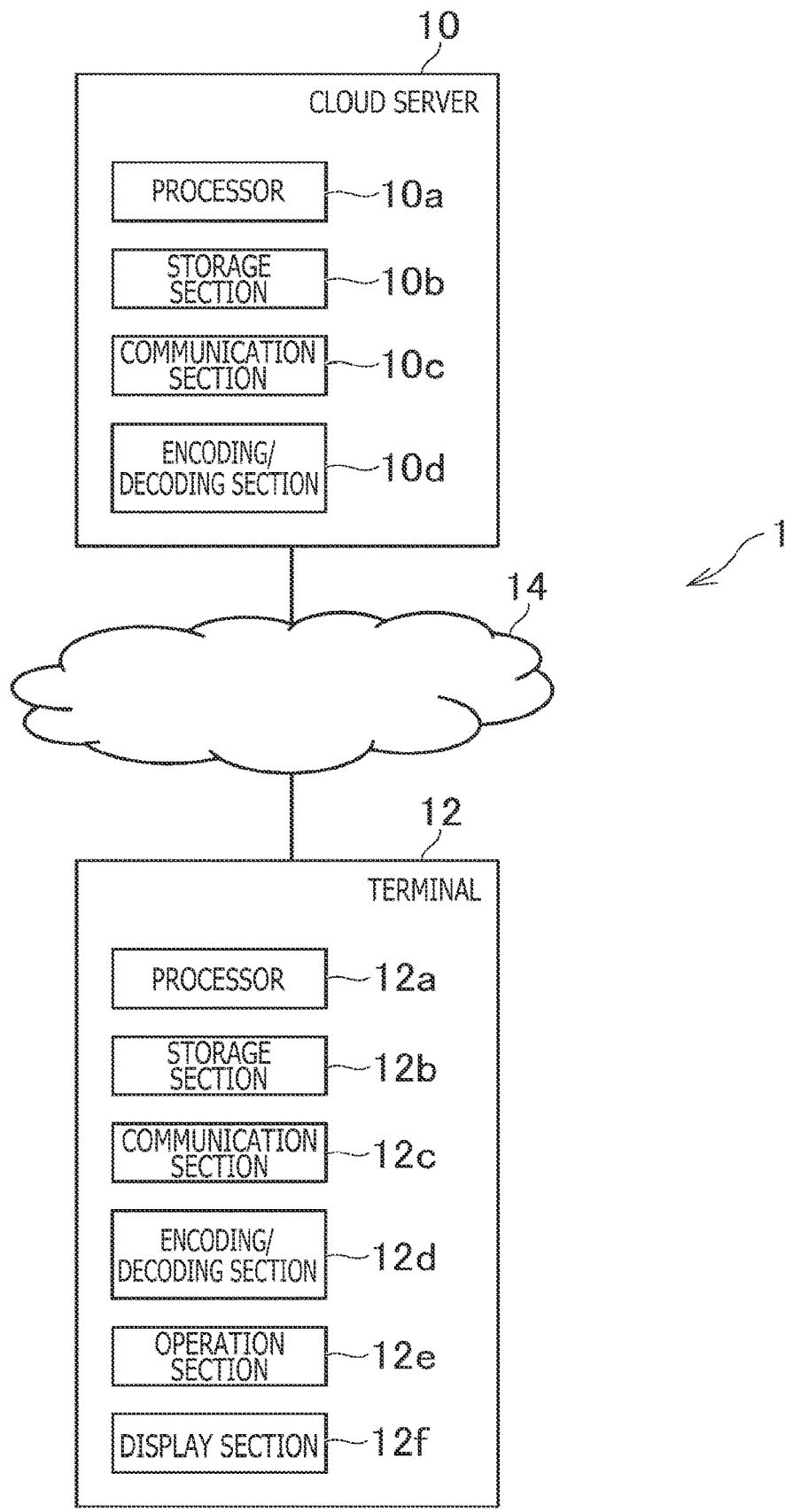
FIG. 1 is a schematic diagram depicting an example of the overall configuration of a cloud gaming system according to one embodiment of the present invention.

FIG. 1 is a schematic diagram depicting an example of the overall configuration of a cloud gaming system 1 according to one embodiment of the present invention. As depicted in FIG. 1, the cloud gaming system 1 of the present embodiment includes a cloud server 10 and a terminal 12 each configured with a computer as a main component. The cloud server 10 and the terminal 12 are connected to a computer network 14 such as the Internet and are communicable with each other.

The cloud server 10 of the present embodiment is a server computer that executes a program of a game related to a cloud gaming service, for example. The cloud server 10 distributes moving images representing the play status of the game, to the terminal 12 used by a user playing the game.

As depicted in FIG. 1, the cloud server 10 includes, for example, a processor 10a, a storage section 10b, a communication section 10c, and an encoding/decoding section 10d.

The processor 10a is, for example, a program-controlled device such as a CPU (Central Processing Unit). The processor 10a performs various types of information processing according to programs stored in the storage section 10b. The processor 10a of the present embodiment also includes a GPU (Graphics Processing Unit) that renders images in a frame buffer on the basis of graphics commands and data supplied from the CPU.

The storage section 10b is a storage element such as a ROM (Read-Only Memory) or a RAM (Random-Access Memory) or a hard disk drive, for example. The storage section 10b stores, for example, the programs to be executed by the processor 10a. Further, the storage section 10b of the present embodiment allocates regions for the frame buffer in which images are rendered by the GPU included in the processor 10a.

The communication section 10c is a communication interface for exchanging data with a computer such as the terminal 12 via the computer network 14, for example.

The encoding/decoding section 10d includes, for example, an encoder that encodes images to generate image data and a decoder that decodes image data to generate images.

The terminal 12 of the present embodiment is, for example, a computer such as a game console, a personal computer, a tablet terminal, or a smartphone used by a user who uses the cloud gaming service.

As depicted in FIG. 1, the terminal 12 includes a processor 12a, a storage section 12b, a communication section 12c, an encoding/decoding section 12d, an operation section 12e, and a display section 12f, for example.

The processor 12a is, for example, a program-controlled device such as a CPU. The processor 12a performs various types of information processing according to programs stored in the storage section 12b. The processor 12a of the present embodiment also includes a GPU that renders images in a frame buffer on the basis of graphics commands and data supplied from the CPU.

The storage section 12b is a storage element such as a ROM or a RAM or a hard disk drive, for example. The storage section 12b stores, for example, the programs to be executed by the processor 12a. Further, the storage section 12b of the present embodiment allocates regions for the frame buffer in which images are rendered by the GPU included in the processor 12a.

The communication section 12c is a communication interface for exchanging data with a computer such as the cloud server 10 via the computer network 14, for example.

The encoding/decoding section 12d includes an encoder and a decoder, for example. The encoder encodes an image that is received as input, to generate image data representing the received image. The decoder decodes image data that is received as input, to output an image represented by the received image data.

The operation section 12e is an operating member that performs operation input to the processor 12a, for example.

The display section 12f is, for example, a display device such as a liquid crystal display or an organic EL (Electroluminescent) display.

When an operation regarding a game is performed through the operation section 12e on the terminal 12 of the present embodiment, an operation signal representing the operation is transmitted from the terminal 12 to the cloud server 10. Then, the cloud server 10 executes game processing corresponding to the operation signal. This generates a play image representing the play status of the game affected by the operation signal. With the present embodiment, the game processing and the generation of play images are executed at a predetermined frame rate (e.g., 60 fps). It is to be noted that the game processing and the generation of play images may be executed with the present embodiment at a variable frame rate.

In the present embodiment, not image data representing the play image but image data representing an image downscaled from the play image is transmitted here from the cloud server 10 to the terminal 12. In the ensuing description, a play image that is yet to be downscaled will be referred to as an original image, and an image downscaled from the original image will be referred to as a downscaled image. Here, the original image may be a 4K image, and the downscaled image may be a 2K image.

The terminal 12 then generates an image higher in resolution than the above-mentioned downscaled image, on the basis of the image data received from the cloud server 10. In the following description, the image that is generated in such a manner and is higher in resolution than the downscaled image will be referred to as an upscaled image. The upscaled image is then displayed on the display section 12f of the terminal 12.

Here, the upscaled image should preferably be as close to the original image as possible. However, in a case where the upscaled image is generated solely from the image data representing the downscaled image, an image similar to the original image may not be generated.

Therefore, the present embodiment generates an image that is higher in resolution than the downscaled image and is more similar to the original image, from the image data representing the downscaled image, in such a manner as described below.

The following describes functions of the cloud gaming system 1 of the present embodiment and processing performed by the cloud gaming system 1, with emphasis on how an upscaled image is generated.

Figure 2:
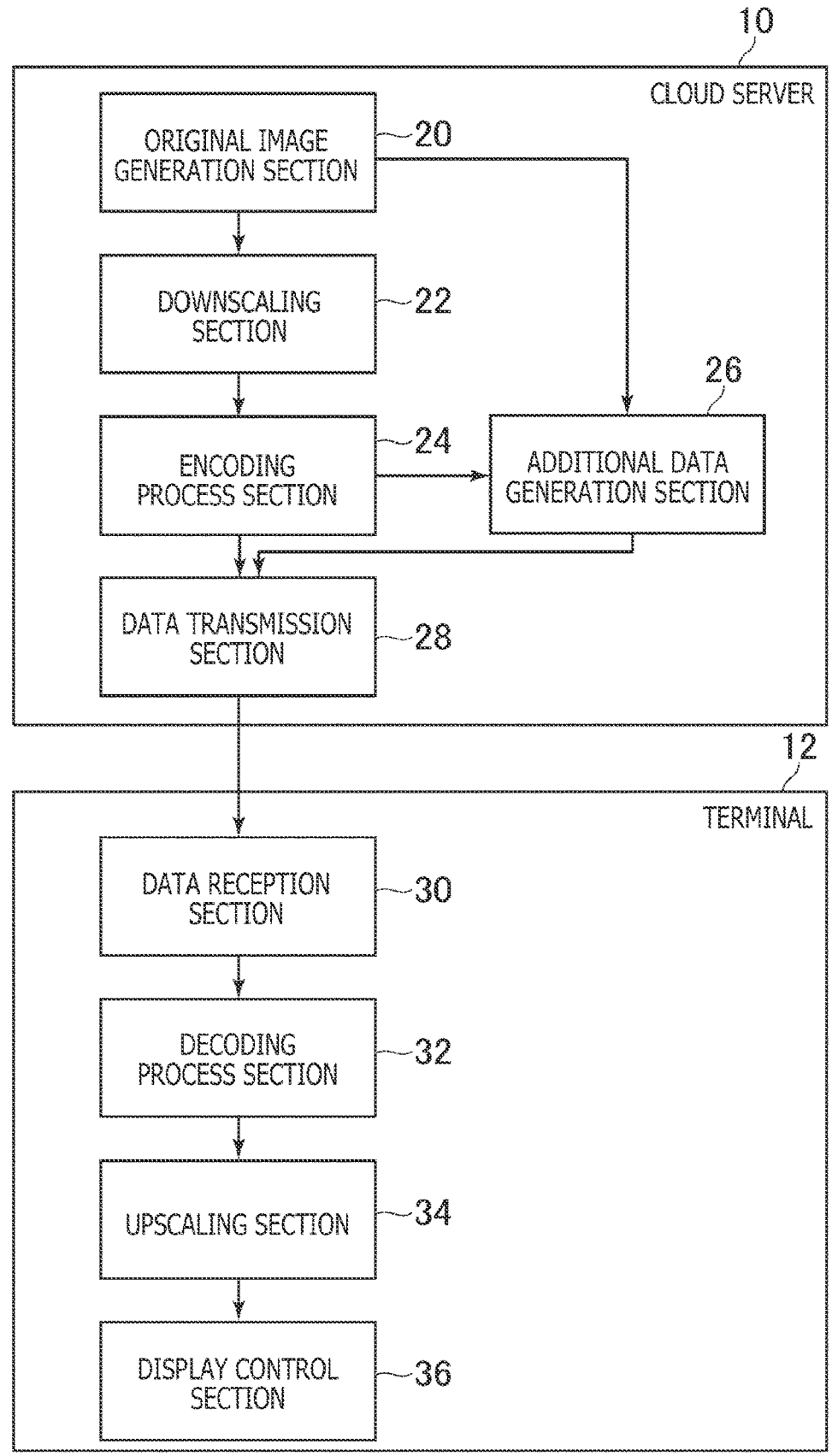
FIG. 2 is a functional block diagram depicting an example of functions implemented by the cloud gaming system according to the embodiment of the present invention.

FIG. 2 is a functional block diagram depicting an example of functions implemented by the cloud gaming system 1 of the present embodiment. It is to be noted that not all functions depicted in FIG. 2 need to be implemented by the cloud gaming system 1 of the present embodiment and that functions other than those in FIG. 2 (e.g., game processing functions based on operation signals or the like) may be implemented.

As depicted in FIG. 2, the cloud server 10 of the present embodiment functionally includes an original image generation section 20, a downscaling section 22, an encoding process section 24, an additional data generation section 26, and a data transmission section 28, for example. In the present embodiment, the cloud server 10 functions as an image transmission apparatus that transmits image data.

The original image generation section 20, the downscaling section 22, and the additional data generation section 26 are implemented by using mainly the processor 10a. The encoding process section 24 is implemented by using mainly the encoding/decoding section 10d. The data transmission section 28 is implemented by using mainly the communication section 10c.

The above functions are implemented by the processor 10a executing a program installed in the cloud server 10 serving as a computer, the program including commands corresponding to the above functions. The program is supplied to the cloud server 10 either by means of computer-readable information storage media such as an optical disk, a magnetic disk, a magnetic tape, a magneto-optical disk, and a flash memory, or via the Internet, for example.

Also, as depicted in FIG. 2, the terminal 12 of the present embodiment functionally includes a data reception section 30, a decoding process section 32, an upscaling section 34, and a display control section 36, for example. The data reception section 30 is implemented by using mainly the communication section 12c. The decoding process section 32 is implemented by using mainly the encoding/decoding section 12d. The upscaling section 34 is implemented by using mainly the processor 12a and the storage section 12b. The display control section 36 is implemented by using mainly the processor 12a and the display section 12f. In the present embodiment, the terminal 12 functions as an image reception apparatus that receives image data.

The above functions are implemented by the processor 12a executing a program installed in the terminal 12 serving as a computer, the program including commands corresponding to the above functions. The program is supplied to the terminal 12 either by means of computer-readable information storage media such as an optical disk, a magnetic disk, a magnetic tape, a magneto-optical disk, and a flash memory, or via the Internet, for example.

In the present embodiment, the original image generation section 20 generates the above-described original image, for example. As described above, the original image may be the play image representing the play status of a game, for example.

In the present embodiment, the downscaling section 22 generates the downscaled image, which is an image downscaled from the original image generated by the original image generation section 20, for example.

In the present embodiment, the encoding process section 24 generates the image data representing the downscaled image obtained, for example, by downscaling the original image. For example, the encoding process section 24 encodes the downscaled image generated by the downscaling section 22, thereby generating the image data representing the downscaled image. Here, the downscaled image may be compression-encoded to generate image data smaller in size than the downscaled image. The encoding methods for encoding downscaled images include, for example, MPEG-4 AVC (Advanced Video Coding)/H.264 and HEVC (High Efficiency Video Coding)/H.265.

In the present embodiment, the additional data generation section 26 generates additional data on the basis of the original image generated by the original image generation section 20, the additional data being unidentifiable by the image data alone that represents the downscaled image.

Figure 3:
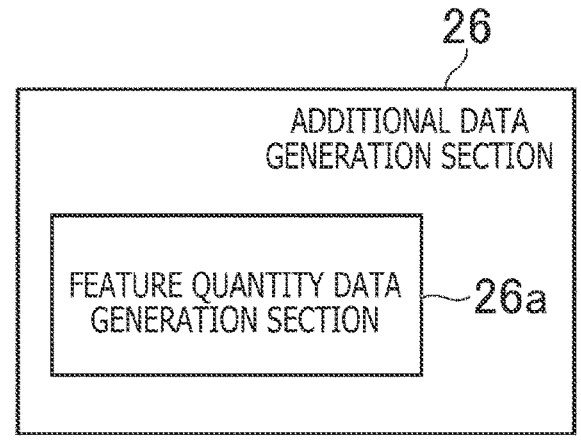
FIG. 3 is a schematic diagram depicting a configuration example of an additional data generation section.

Here, as depicted in FIG. 3, the additional data generation section 26 may include a feature quantity data generation section 26a that generates feature quantity data indicative of at least either a feature quantity of the original image or a feature quantity as a parameter used for encoding the downscaled image.

Here, the feature quantity data may include data indicative of at least one of a feature point of the original image, an edge strength of the original image, the depth of each of the pixels included in the original image, a texture type of the original image, an optical flow of the original image, and ME (Motion Estimation) information representing a direction and a velocity in which and at which a rectangular region in the image moves. For example, the feature quantity data generation section 26a may extract feature quantities of the original image and generate feature quantity data indicative of the extracted feature quantities. The feature quantity data may include, for example, data indicative of the texture type of the original image (e.g., data indicative of the positions of an edge region, a flat region, a high density region, a detail region, and a crowd region). The feature quantity data may further include data indicative of the position of the Harris corner feature point of the original image and the edge strength thereof. The feature quantity data may also include data indicative of the optical flow of the original image. The feature quantity data may further include depth data indicative of the depth of each of the pixels included in the original image.

In addition, the feature quantity data generation section 26a may perform an object recognition process on the original image. The feature quantity data may include data indicative of the object identified by the object recognition process and represented by the original image.

The feature quantity data generation section 26a may also generate feature quantity data indicative of the feature quantity used by the encoding process section 24 as a parameter for encoding. The feature quantity data may include ME information data indicative of the direction and the velocity in which and at which a rectangular region in the image moves. The feature quantity data may also include CU unit allocation information data indicative of the positions to which differently sized CU units are allocated by size. The feature quantity data may further include data indicative of a ROI (Region of Interest) to which a high bit rate is allocated for higher image quality. The feature quantity data may also include data indicative of a quantization parameter value. The feature quantity data may further include data indicating whether or not the scene is changed and data indicating whether or not the frame is a key frame (I frame).

For example, the feature quantity data generation section 26a may also generate feature quantity data indicative of the feature quantity of the original image and the feature quantity used by the encoding process section 24 as a parameter for encoding. As another example, the feature quantity data generation section 26a may generate feature quantity data including the data generated on the basis of both the data representing the feature quantity of the original image and the data representing the feature quantity used by the encoding process section 24 as a parameter for encoding. For example, the feature quantity data generation section 26a may determine whether or not it is necessary to perform super-resolution processing, on the basis of the data representing the feature quantity of the original image and the data representing the feature quantity used by the encoding process section 24 as a parameter for encoding. Then, the feature quantity data generation section 26*a* may generate feature quantity data including the data indicating whether or not it is necessary to perform super-resolution processing.

The additional data generation section 26 may generate additional data including the above-described feature quantity data generated by the feature quantity data generation section 26*a*.

In the present embodiment, the data transmission section 28 transmits, to the terminal 12, the image data and the additional data corresponding to the image data, in such a manner as to associate the image data with the additional data, for example. Here, the image data generated on the basis of the downscaled image obtained by downscaling the original image, and the additional data generated from the original image may be transmitted to the terminal 12 in a mutually associated manner, for example. The additional data may otherwise be transmitted from the cloud server 10 to the terminal 12, as sideband information regarding the image data.

Here, it is preferred that the size of the additional data generated by the additional data generation section 26 be as small as possible in order to reduce the traffic between the cloud server 10 and the terminal 12.

In the present embodiment, the data reception section 30 receives the above-mentioned image data and additional data transmitted from the cloud server 10, for example.

In the present embodiment, the decoding process section 32 generates an image by decoding the image data received by the data reception section 30, for example. In the ensuing description, the image generated in such a manner will be referred to as a decoded image. In the present embodiment, the decoded image has the same resolution as the downscaled image (e.g., 2K image). In the case where the encoding method for the downscaled image is a lossy encoding method, the decoded image is generally not exactly the same as the downscaled image.

In the present embodiment, the upscaling section 34 generates the upscaled image higher in resolution than the downscaled image generated by the downscaling section 22, on the basis of the image data and additional data received by the data reception section 30, for example. Here, the upscaling section 34 may generate the upscaled image on the basis of the image data received by the data reception section 30 and the feature quantity data included in the additional data received by the data reception section 30, for example. The upscaled image may have the same resolution as the original image (e.g., 4K image). An upscaled image generation process will be described later in detail.

In the present embodiment, the display control section 36 displays the upscaled image generated by the upscaling section 34, for example. Here, the display control section 36 causes the display section 12*f* of the terminal 12 to display the upscaled image, for example.

Figure 4:
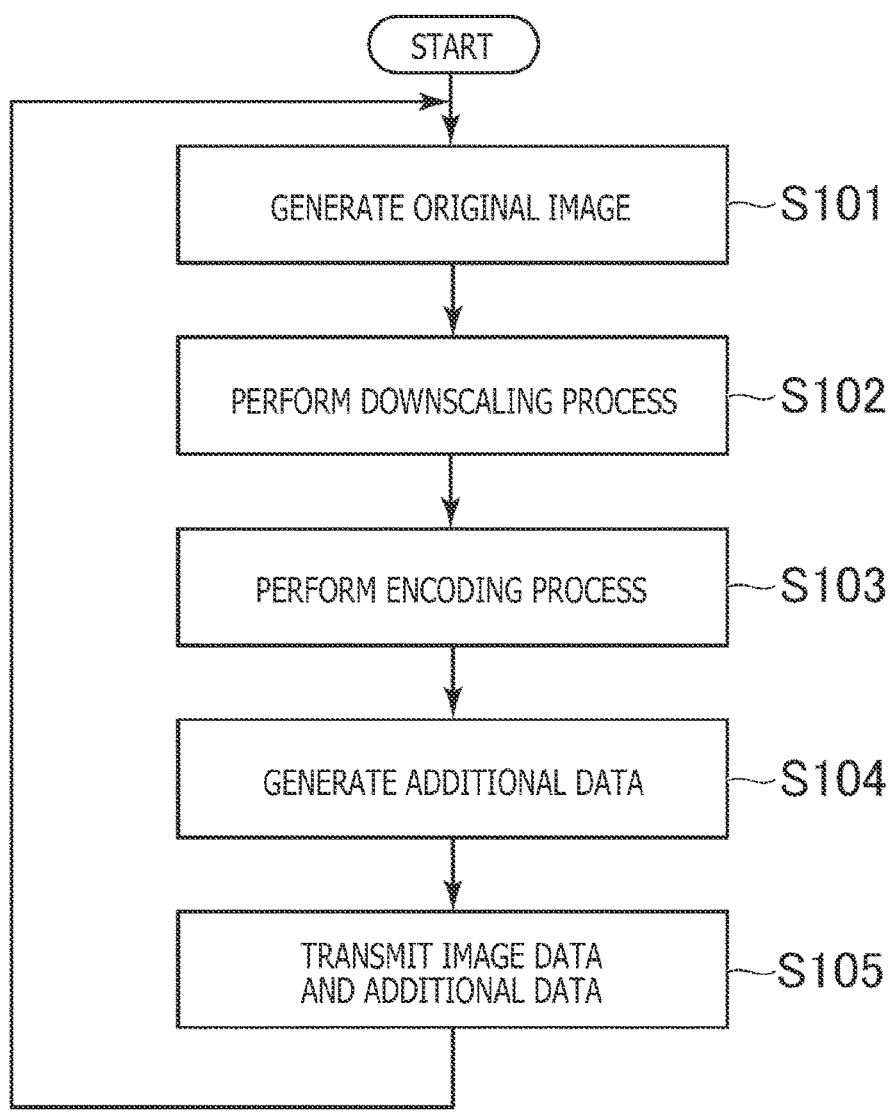
FIG. 4 is a flowchart depicting an example of a process performed by a cloud server according to the embodiment of the present invention.

Explained below with reference to the flowchart in FIG. 4 is an example of a process of generating and transmitting image data that is performed by the cloud server 10 of the present embodiment. The steps of S101 to S105 in FIG. 4 are executed repetitively at a predetermined frame rate (e.g., 60 fps). It is to be noted that the steps of S101 to S105 may be executed repetitively at a variable frame rate.

First, the original image generation section 20 generates an original image of the current frame (S101). Here, as described above, it is possible to generate the original image of the current frame that indicates the play status of the game affected by the operation signal received from the terminal 12.

The downscaling section 22 then performs a downscaling process on the original image generated in the step of S101, thus generating a downscaled image (S102).

Then, the encoding process section 24 performs an encoding process on the downscaled image generated in the step of S102, generating image data (S103).

The additional data generation section 26 then generates additional data (S104). In the step of S104, the feature quantity data generation section 26*a* may generate feature quantity data indicative of the feature quantity of the original image generated in the step of S101, for example. Here, the feature quantity data indicating the feature quantity extracted from the original image generated in the step of S101 may be generated, for example. As another example, the feature quantity data generation section 26*a* may generate the feature quantity data indicating the feature quantity as a parameter for encoding in S103. As a further example, the feature quantity data generation section 26*a* may generate the feature quantity data indicative of both the feature quantity extracted from the original image generated in the step of S101 and the feature quantity as a parameter for encoding in S103. The additional data generation section 26 may generate additional data including the feature quantity data generated by the feature quantity data generation section 26*a*.

The data transmission section 28 then transmits, to the terminal 12, the image data generated in the step of S103 and the additional data generated in the step of S104 (S105), and returns to the step of S101.

Figure 5:
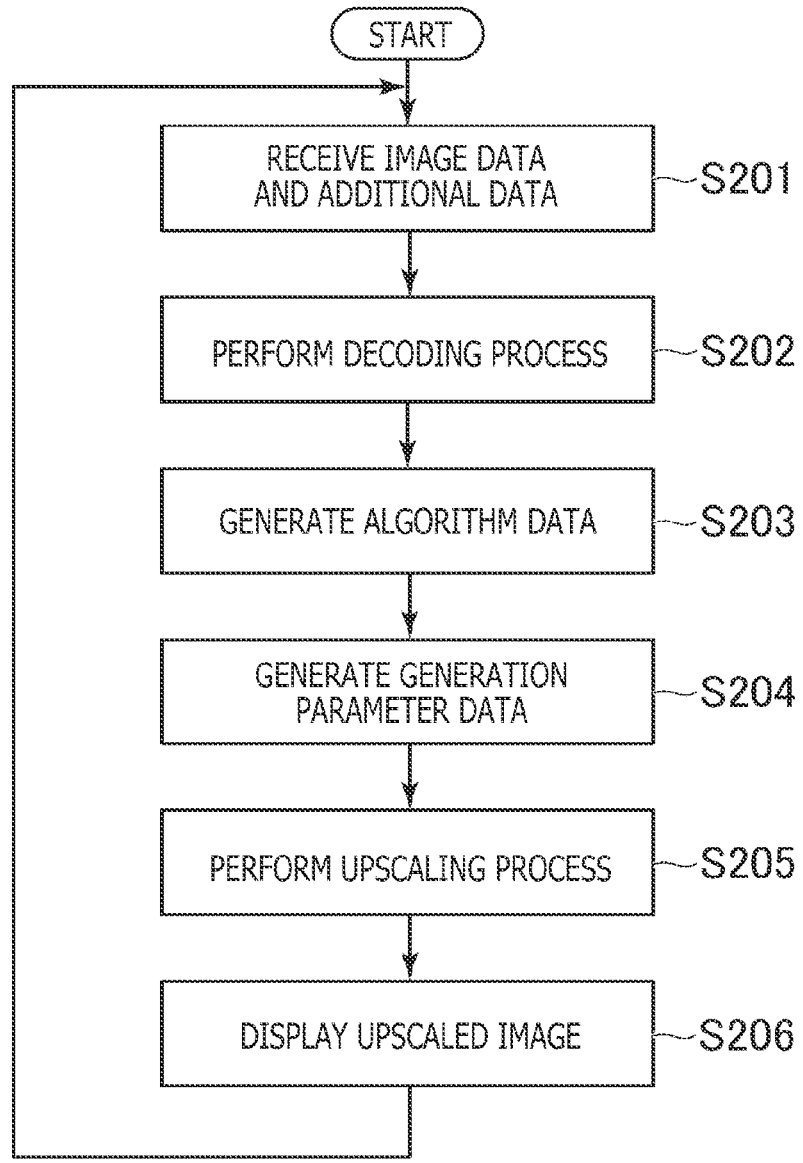
FIG. 5 is a flowchart depicting an example of a process performed by a terminal according to the embodiment of the present invention.

Explained next with reference to the flowchart in FIG. 5 is an example of a process of generating and display-controlling the upscaled image that is performed by the terminal 12 of the present embodiment. The steps of S201 to S206 in FIG. 5 are executed repetitively at a predetermined frame rate (e.g., 60 fps). It is to be noted that the steps of S201 to S206 in FIG. 5 may be executed repetitively at a variable frame rate.

First, the data reception section 30 receives the image data and additional data transmitted from the cloud server 10 in the step of S105 (S201).

The decoding process section 32 performs a decoding process on the image data received in the step of S201, thereby generating a decoded image (S202).

The upscaling section 34 then generates algorithm data indicative of whether or not the decoded image is suitable for super-resolution, a type of interpolation algorithm for use in super-resolution processing, a type of weight, and a group of adjustment parameters (S203). The types of interpolation algorithm include linear interpolation, FCBI (Fast Curvature Based Interpolation), and ICBI (Interactive Curve Based Interpolation) for example. Here, the algorithm data may be generated on the basis of the decoded image generated in the step of S202 and the feature quantity data included in the additional data received in the step of S201.

In the step of S203, the algorithm data may be generated on the basis of a known input determination function used in super-resolution processing or an input determination function that is newly created and has not been known, for example. As another example, the algorithm data may be generated by using an input determination function dictionary 40 indicated in FIG. 6.

Figure 6:
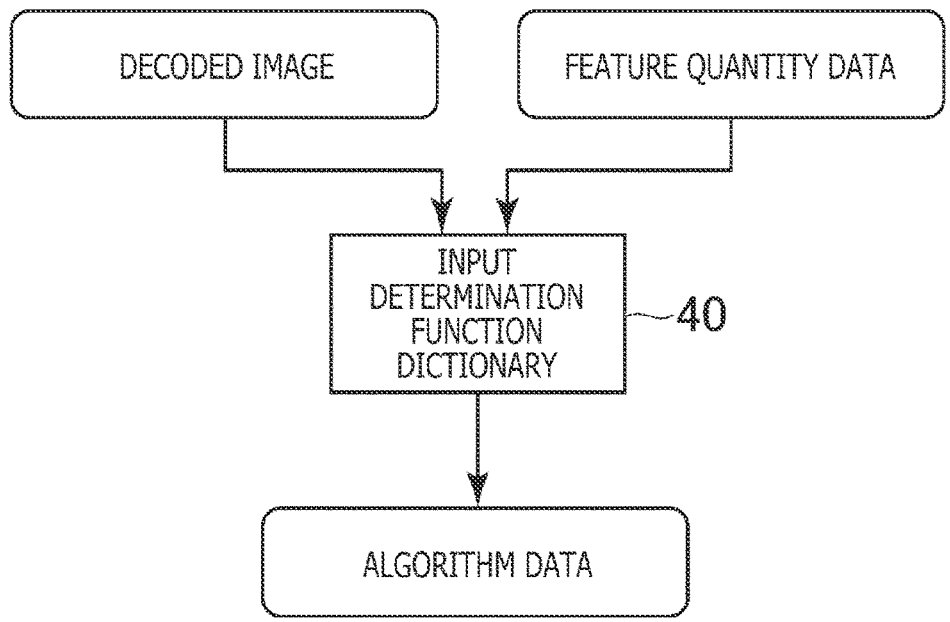
FIG. 6 is a diagram schematically depicting an example of an input determination function dictionary.

The input determination function dictionary 40 depicted in FIG. 6 is implemented by using a trained machine learning model, for example. Here, the trained machine learning model may be a model that uses a deep learning technology. The input determination function dictionary 40 is included in the upscaling section 34, for example.

The input determination function dictionary 40 depicted in FIG. 6 receives, as input, the decoded image generated in the step of S202 and the feature quantity data included in the additional data received in the step of S201, for example. Then, the input determination function dictionary 40 outputs the algorithm data according to the input.

Figure 7:
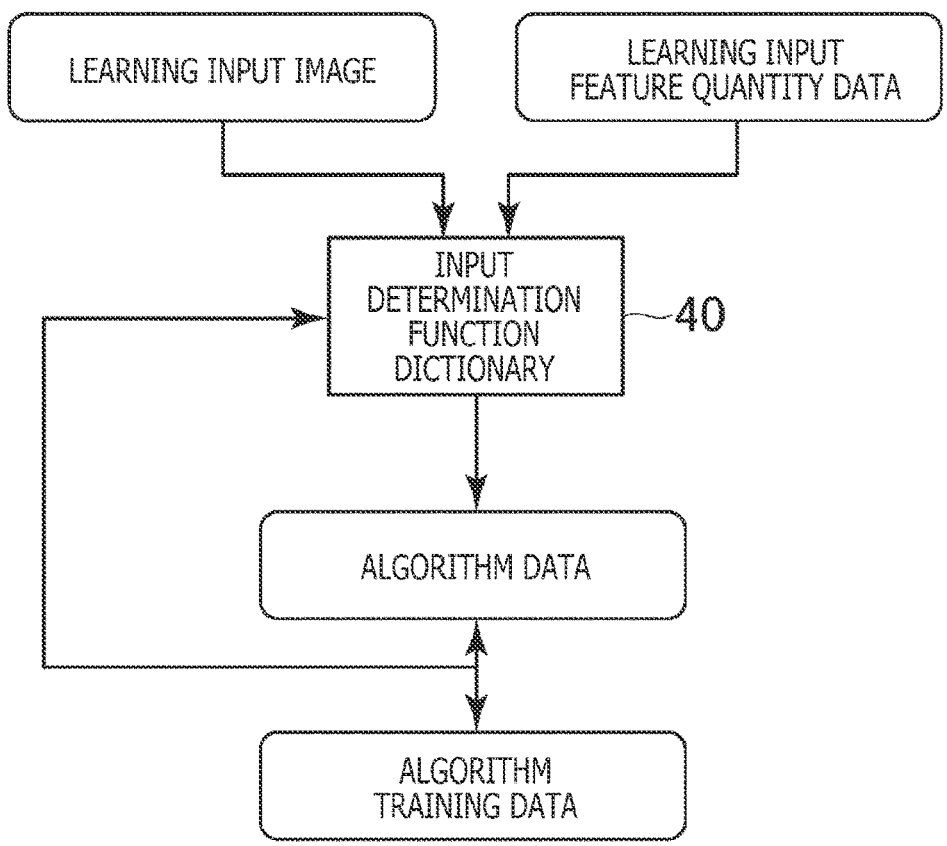
FIG. 7 is a diagram schematically depicting an example of learning performed by the input determination function dictionary indicated in FIG. 6.

FIG. 7 schematically depicts an example of learning performed by the input determination function dictionary 40 indicated in FIG. 6. The input determination function dictionary 40 is trained by use of multiple pieces of learning data. The multiple pieces of learning data include learning input data and algorithm training data, for example. The learning input data includes a learning input image and learning input feature quantity data. The algorithm training data is training data to be compared with the algorithm data output from the input determination function dictionary 40.

For example, the learning input image which is a low-resolution image (e.g., 2K image) may be generated by performing the above-described downscaling process, encoding process, and decoding process on a high-resolution image (e.g., 4K image). Then, the learning input feature quantity data which is feature quantity data corresponding to the high-resolution image may be generated by processes similar to those described above.

Next, the algorithm training data which is algorithm data suitable for generating the high-resolution image from the learning input image may be identified by empirical rules, by visual confirmation by the user, or by experiments involving various types of algorithm data, for example.

Then, the learning data that includes the learning input data and the algorithm training data may be generated. The learning input data includes the above-described learning input image and learning input feature quantity data. Then, the input determination function dictionary 40 may be trained by supervised learning involving the use of multiple pieces of learning data generated as described above on the basis of numerous high-resolution images. For example, the algorithm data that is output from the input determination function dictionary 40 when the learning input data included in the learning data is input to the input determination function dictionary 40 may be compared with the algorithm training data included in the learning data. The input determination function dictionary 40 may then be trained by updating parameters of the input determination function dictionary 40 by the error back-propagation method (back propagation) on the basis of the result of the comparison.

It is to be noted that the training of the input determination function dictionary 40 is not limited to the above-mentioned method. Alternatively, the input determination function dictionary 40 may be trained by unsupervised learning or by reinforcement learning, for example.

Some of the elements included in the algorithm data may be identified by calculations using the input determination function, on the basis of the decoded image or on the basis of the decoded image and feature quantity data. The remaining elements may then be output from the input determination function dictionary 40. In such a case, the input determination function dictionary 40 may be trained by use of training data corresponding to the remaining elements.

When the step of S203 is completed, the upscaling section 34 generates generation parameter data indicative of, for example, how to determine a pixel value of a pixel in question for pixel interpolation on the basis of a pixel value of one of pixels located around the pixel in question at a ratio by using an interpolation formula (S204). Here, the generation parameter data may be generated on the basis of the algorithm data generated in the step of S203, the decoded image generated in the step of S202, and the feature quantity data received in the step of S201.

In the step of S204, the generation parameter data may be generated on the basis of either a known output generation function for use in super-resolution processing or an output generation function that is newly created and has not been known, for example. Alternatively, the generation parameter data may be generated by using an output generation function dictionary 42 indicated in FIG. 8.

Figure 8:
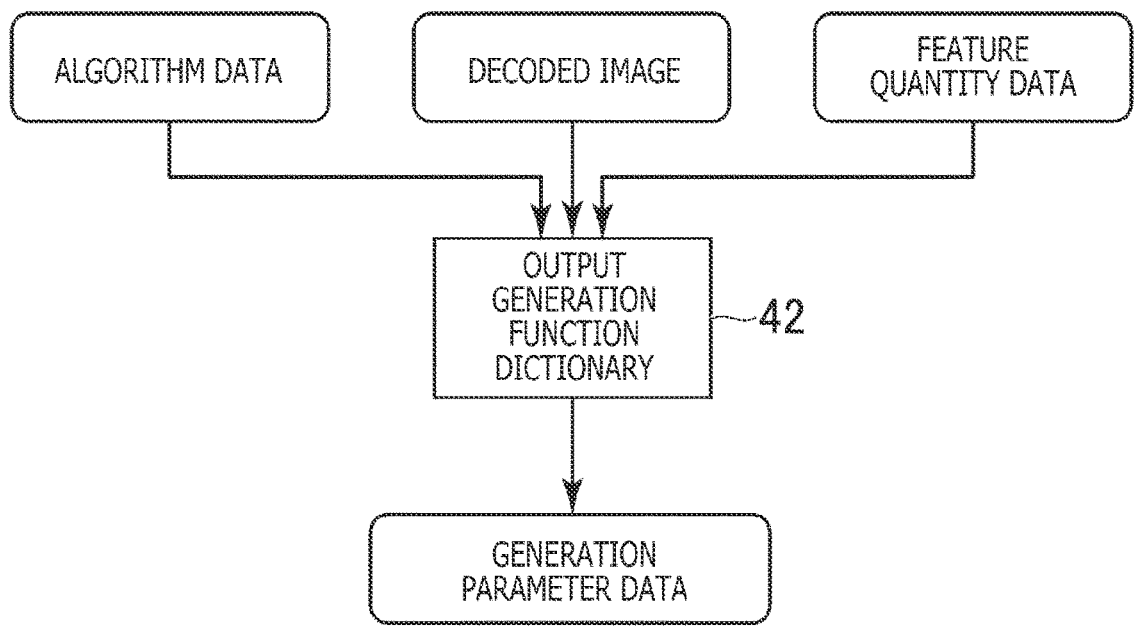
FIG. 8 is a diagram schematically depicting an example of an output generation function dictionary.

The output generation function dictionary 42 depicted in FIG. 8 is implemented by using a trained machine learning model, for example. Here, the trained machine learning model may be a model that uses the deep learning technology. Further, the output generation function dictionary 42 is included in the upscaling section 34, for example.

The output generation function dictionary 42 indicated in FIG. 8 receives, as input, the algorithm data generated in the step of S203, the decoded image generated in the step of S202, and the feature quantity data received in the step of S201. Then, the output generation function dictionary 42 outputs the generation parameter data according to the input.

Figure 9:
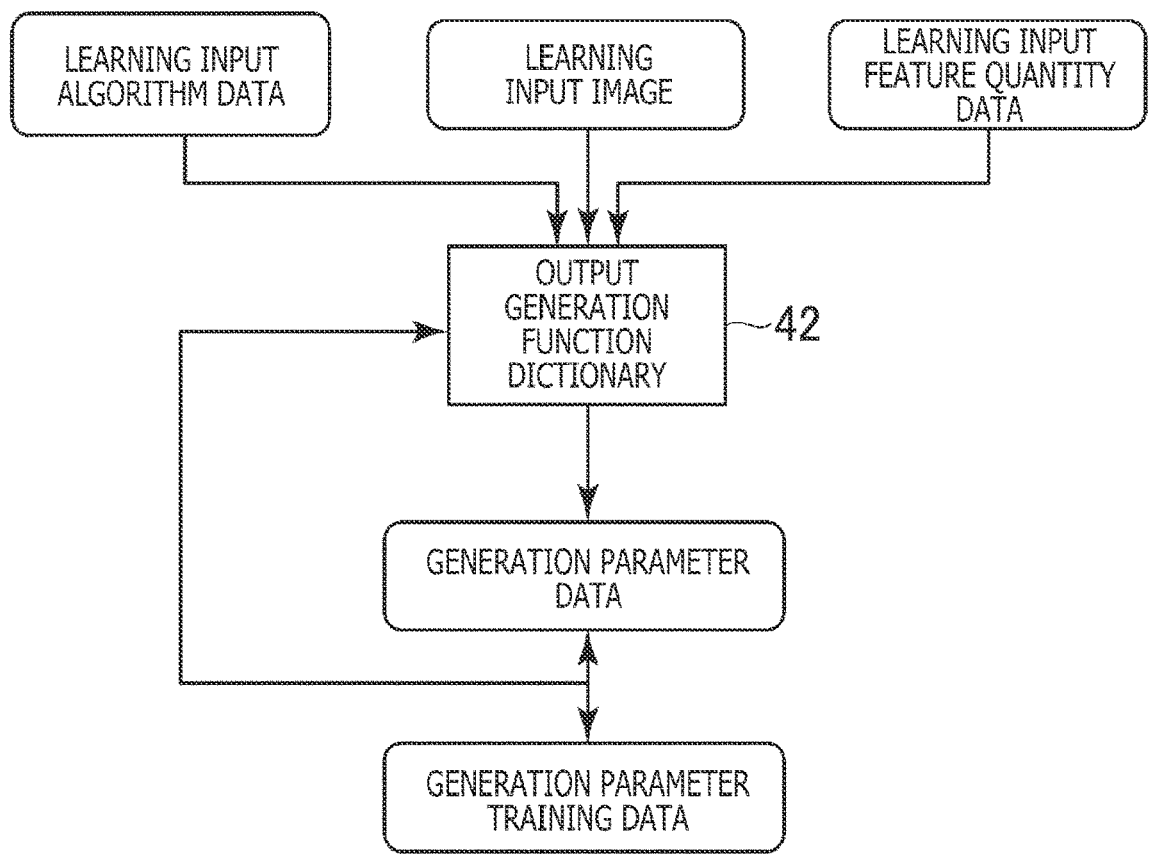
FIG. 9 is a diagram schematically depicting an example of learning performed by the output generation function dictionary indicated in FIG. 8.

FIG. 9 schematically depicts an example of learning performed by the output generation function dictionary 42 indicated in FIG. 8. The output generation function dictionary 42 is trained by use of multiple pieces of learning data, for example. The multiple pieces of learning data include learning input data and generation parameter training data, for example. The learning input data includes learning input algorithm data, a learning input image, and learning input feature quantity data. The generation parameter training data is training data to be compared with the generation parameter data output from the output generation function dictionary 42.

For example, the learning input image which is a low-resolution image (e.g., 2K image) may be generated by performing the above-described downscaling process, encoding process, and decoding process on a high-resolution image (e.g., 4K image). Then, the learning input feature quantity data which is the feature quantity data corresponding to the high-resolution image may be generated by processes similar to those described above.

The values of the learning input algorithm data which is algorithm data suitable for generating the high-resolution image from the learning input image may then be identified by the user by use of empirical rules, visual confirmation, or experiments involving various types of algorithm data, for example. Here, it is to be noted that the output that is output from the input determination function dictionary 40, which is a trained machine learning model, when the learning input image and the learning input feature quantity data are input to the input determination function dictionary 40, may be identified as the learning input algorithm data.

The generation parameter training data which is generation parameter data suitable for generating the high-resolution image from the learning input image may then be identified by empirical rules, by visual confirmation by the user, or by experiments involving various types of generation parameter data, for example.

Then, the learning data that includes the learning input data and generation parameter training data may be generated. The learning input data includes the above-described learning input algorithm data, learning input image, and learning input feature quantity data. The output generation function dictionary 42 may then be trained by supervised learning involving the use of multiple pieces of learning data generated as described above on the basis of numerous high-resolution images. For example, the generation parameter data that is output from the output generation function dictionary 42 when the learning input data included in the learning data is input to the output generation function dictionary 42 may be compared with the generation parameter training data included in the learning data. The output generation function dictionary 42 may then be trained by updating parameters of the output generation function dictionary 42 by the error back-propagation method (back propagation) on the basis of the result of the comparison.

It is to be noted that the training of the output generation function dictionary 42 is not limited to the above-mentioned method. Alternatively, the output generation function dictionary 42 may be trained by unsupervised learning or by reinforcement learning, for example.

When the step of S204 is completed, the upscaling section 34 performs super-resolution processing and carries out an upscaling process on the decoded image generated in the step of S202, to generate an upscaled image (S205). In the step of S205, there may be executed either known super-resolution processing or super-resolution processing that is newly created and has not been known. Executed here is, for example, the super-resolution processing based on the algorithm data generated in the step of S203 and the generation parameter data generated in the step of S204.

The display control section 36 then causes the display section 12f to display the upscaled image generated in the step of S205 (S206), and returns to the step of S201.

Figure 10:
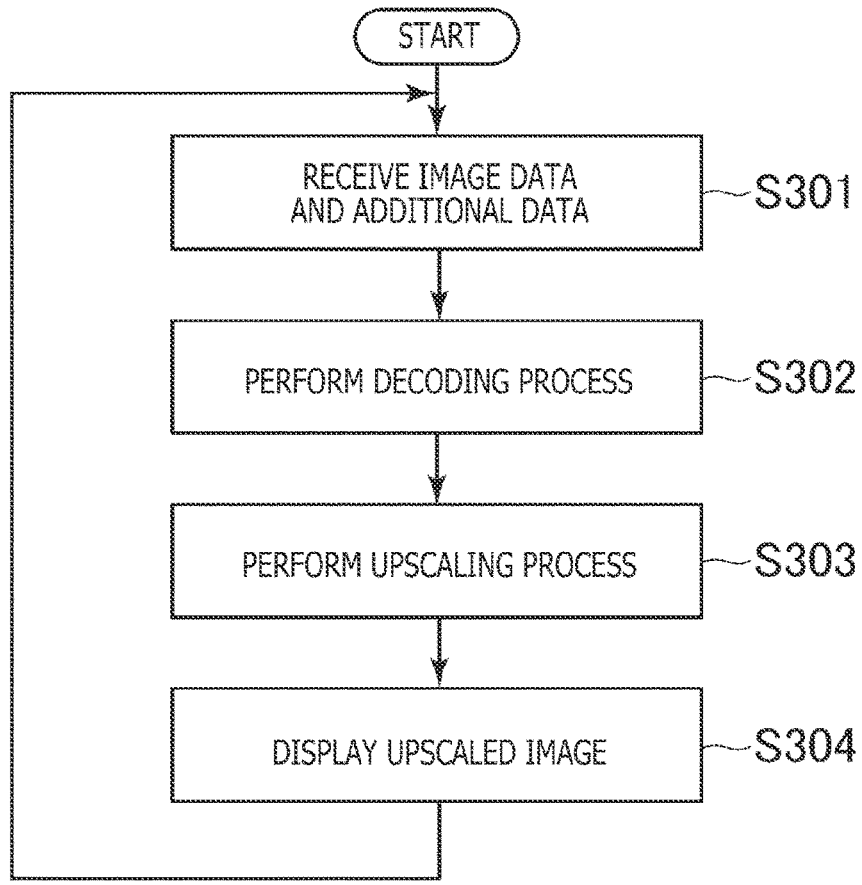
FIG. 10 is a flowchart depicting another example of the process performed by the terminal according to the embodiment of the present invention.

Explained next with reference to the flowchart in FIG. 10 is another example of the process of generating and display-controlling the upscaled image that is executed by the terminal 12 of the present embodiment. The steps of S301 to S304 in FIG. 10 are executed repetitively at a predetermined frame rate (e.g., 60 fps). It is to be noted that the steps of S301 to S304 may be executed repetitively at a variable frame rate.

First, the data reception section 30 receives the image data and additional data transmitted from the cloud server 10 in the step of S105 (S301).

The decoding process section 32 then performs a decoding process on the image data received in the step of S201, thereby generating a decoded image (S302).

The upscaling section 34 performs an upscaling process on the decoded image generated in the step of S302, thereby generating an upscaled image (S303). Here, the upscaling process is performed by using an upscaling model 44 depicted in FIG. 11 which is a trained machine learning model. The upscaling model 44 may be a model that uses the deep learning technology. The upscaling model 44 may include coupled topology information regarding nodes included in a neural network and coupling strength parameter information.

In the step of S303, the upscaling model 44 receives, as input, the decoded image generated in the step of S302 and the feature quantity data included in the additional data received in the step of S301. Then, the upscaling model 44 outputs the upscaled image according to the input. Here, the upscaling model 44 is included in the upscaling section 34, for example.

Figure 11:
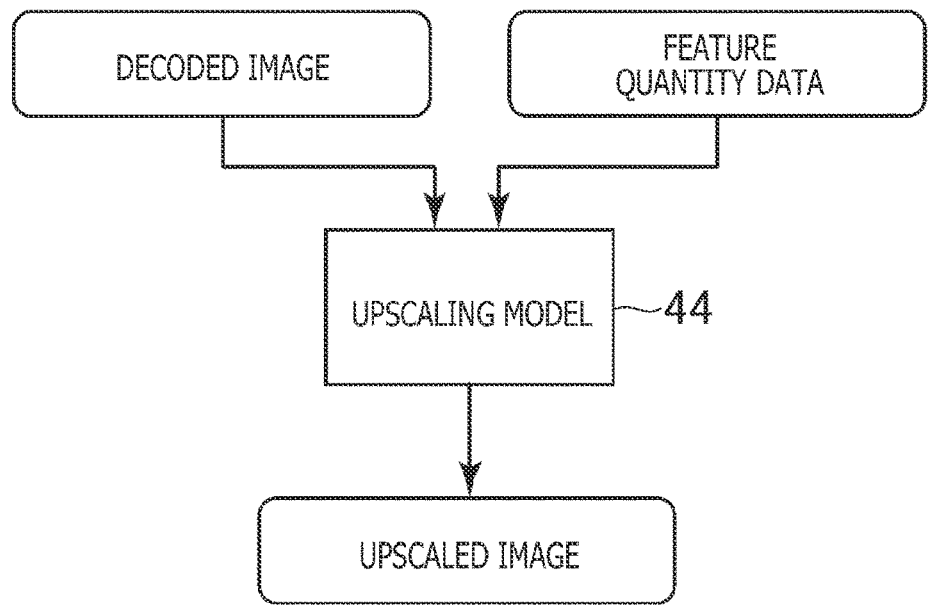
FIG. 11 is a diagram schematically depicting an example of an upscaling model.
Figure 12:
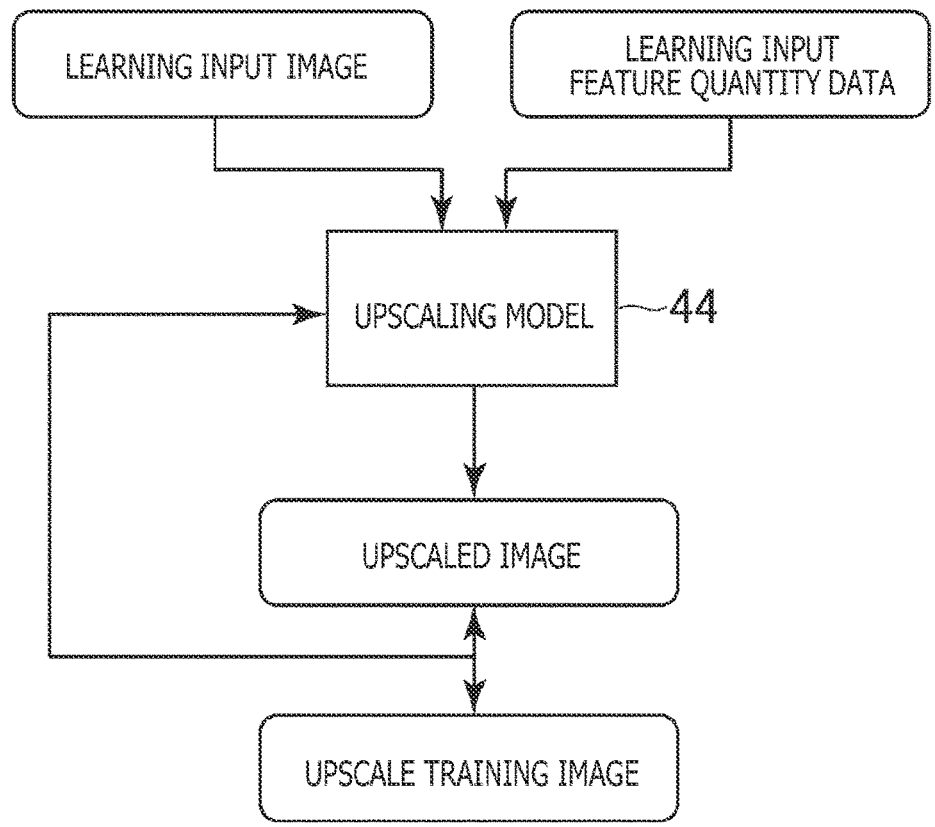
FIG. 12 is a diagram schematically depicting an example of learning performed by the upscaling model indicated in FIG. 10.

FIG. 12 schematically depicts an example of learning performed by the upscaling model 44 indicated in FIG. 11. The upscaling model 44 is trained by use of multiple pieces of learning data, for example. The multiple pieces of learning data include learning input data and an upscale training image, for example. The learning input data includes a learning input image and learning input feature quantity data. The upscale training image is training data to be compared with the upscaled image output from the upscaling model 44.

For example, the learning input image which is a low-resolution image (e.g., 2K image) may be generated by performing the above-described downscaling process, encoding process, and decoding process on a high-resolution image (e.g., 4K image). Then, the learning input feature quantity data which is the feature quantity data corresponding to the high-resolution image may be generated by processes similar to those described above.

Then, the learning data that includes the learning input data and the upscale training image may be generated. The learning input data includes the above-described learning input image and learning input feature quantity data. The upscale training image is the above-mentioned high-resolution image. The upscaling model 44 may then be trained by supervised learning involving the use of multiple pieces of learning data generated as described above on the basis of numerous high-resolution images. For example, the upscaled image that is output from the upscaling model 44 when the learning input data included in the learning data is input to the upscaling model 44 may be compared with the upscale training data included in the learning data. The upscaling model 44 may then be trained by updating parameters of the upscaling model 44 by the error back-propagation method (back propagation) on the basis of the result of the comparison.

It is to be noted that the training of the upscaling model 44 is not limited to the above-mentioned method. Alternatively, the upscaling model 44 may be trained by unsupervised learning or by reinforcement learning, for example.

When the step of S303 is completed, the display control section 36 causes the display section 12f to display the upscaled image generated in the step of S303 (S304), and returns to the step of S301.

In the present embodiment, as depicted in FIG. 5, the upscaled image may be generated by executing the super-resolution processing. Alternatively, the upscaled image may be generated by using the upscaling model 44 without execution of the super-resolution processing, as depicted in FIG. 10.

Figure 13:
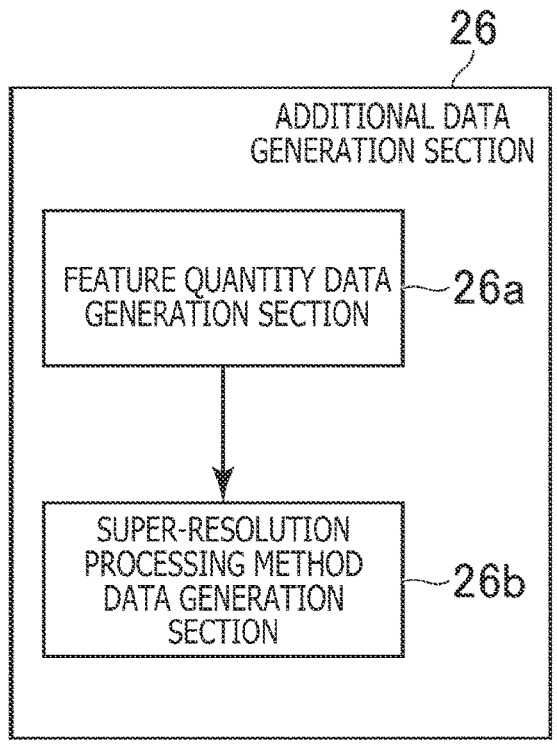
FIG. 13 is a schematic diagram depicting another configuration example of the additional data generation section.

Also, in the present embodiment, as depicted in FIG. 13, the additional data generation section 26 may include a super-resolution processing method data generation section 26b in addition to the feature quantity data generation section 26a.

In the present embodiment, the super-resolution processing method data generation section 26b generates super-resolution processing method data including parameters for use in super-resolution processing, on the basis of the feature quantity data generated by the feature quantity data generation section 26a, for example. Here, the super-resolution processing method data may include the above-described algorithm data and generation parameter data, for example.

Figure 14:
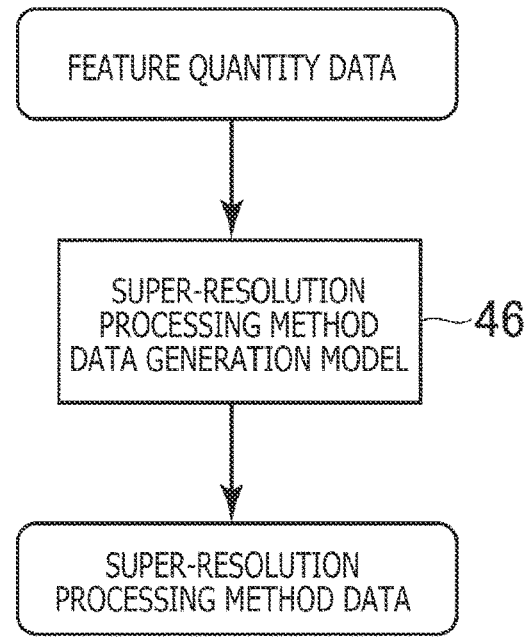
FIG. 14 is a diagram schematically depicting an example of a super-resolution processing method data generation model.

Alternatively, the super-resolution processing method data generation section 26b may generate the super-resolution processing method data by using a super-resolution processing method data generation model 46 depicted in FIG. 14 which is a trained machine learning model. Here, the super-resolution processing method data generation model 46 may be a model that uses the deep learning technology. Further, the super-resolution processing method data generation model 46 is included in the super-resolution processing method data generation section 26b, for example. The super-resolution processing method data generation model 46 may also include coupled topology information regarding nodes included in a neural network and coupling strength parameter information.

Here, the feature quantity data generated by the feature quantity data generation section 26a is input to the super-resolution processing method data generation model 46, for example. Then, the super-resolution processing method data generation model 46 outputs the super-resolution processing method data according to the input.

Figure 15:
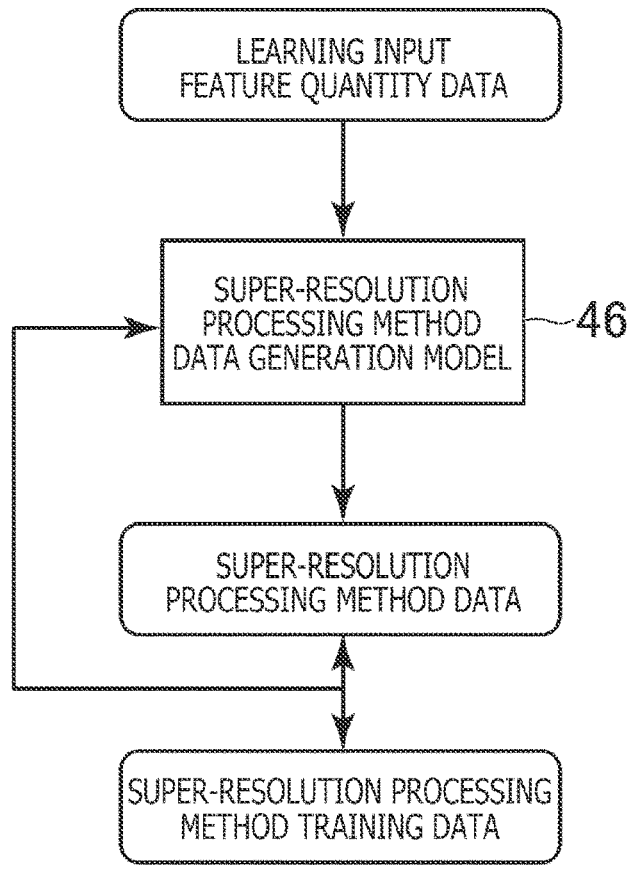
FIG. 15 is a diagram schematically depicting an example of learning performed by the super-resolution processing method data generation model indicated in FIG. 14.

FIG. 15 schematically depicts an example of learning performed by the super-resolution processing method data generation model 46 indicated in FIG. 14. The super-resolution processing method data generation model 46 is trained by use of multiple pieces of learning data, for example. The multiple pieces of learning data include learning input data and super-resolution processing method training data, for example. The learning input data is the learning input feature quantity data. The super-resolution processing method training data is training data to be compared with the super-resolution processing method data output from the super-resolution processing method data generation model 46.

For example, the learning input image which is a low-resolution image (e.g., 2K image) may be generated by performing the above-described downscaling process, encoding process, and decoding process on a high-resolution image (e.g., 4K image). Then, the learning input feature quantity data which is the feature quantity data corresponding to the high-resolution image may be generated by processes similar to those described above.

The values of the super-resolution processing method training data which is super-resolution processing method data suitable for generating the high-resolution image from the learning input image may then be identified by the user by use of empirical rules, visual confirmation, or experiments involving various types of super-resolution processing method data, for example.

Then, the learning data that includes the learning input data and the super-resolution processing method training data may be generated. The learning input data is the above-described learning input feature quantity data. The super-resolution processing method data generation model 46 may be trained by supervised learning involving the use of multiple pieces of learning data generated as described above on the basis of numerous high-resolution images. For example, the super-resolution processing method data that is output from the super-resolution processing method data generation model 46 when the learning input data included in the learning data is input to the super-resolution processing method data generation model 46 may be compared with the super-resolution processing method training data included in the learning data. The super-resolution processing method data generation model 46 may then be trained by updating parameters of the super-resolution processing method data generation model 46 by the error back-propagation method (back propagation) on the basis of the result of the comparison.

In the case where the super-resolution processing method data generation section 26b is included in the additional data generation section 26, the super-resolution processing method data generation section 26b may generate the super-resolution processing method data after the feature quantity data generation section 26a has generated the feature quantity data in the step of S104 of FIG. 4. The additional data generation section 26 may then generate the additional data that includes the super-resolution processing method data generated by the super-resolution processing method data generation section 26b. In the step of S105, the data transmission section 28 may transmit, to the terminal 12, the image data that is generated in the step of S103 and the additional data that is generated in the step of S104 and includes the super-resolution processing method data.

In the above case, the steps of S203 to S205 in the process example of FIG. 5 may be replaced by either known super-resolution processing using the super-resolution processing method data included in the additional data received in the step of S201, or super-resolution processing that is newly created and has not been known. Such super-resolution processing may be carried out to generate an upscaled image through upscaling of the decoded image generated in the step of S202.

Figure 16:
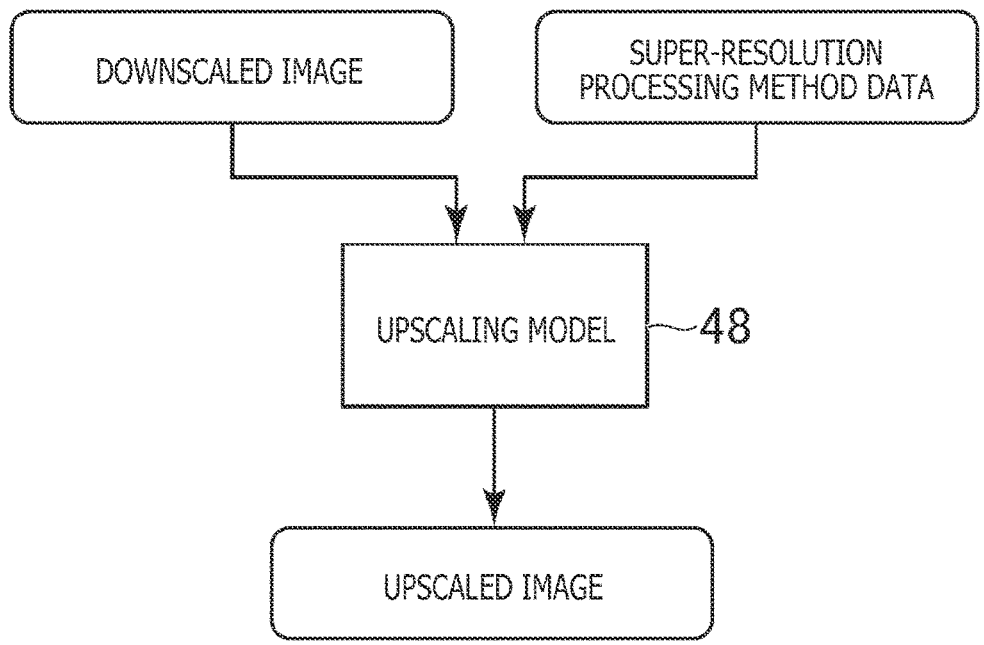
FIG. 16 is a diagram schematically depicting another example of the upscaling model.

Alternatively, an upscaled image may be generated in the step of S303 in the process example of FIG. 10 by upscaling the decoded image generated in the step of S302, by use of an upscaling model 48 depicted in FIG. 16 which is a trained machine learning model. The upscaling model 48 may include coupled topology information regarding nodes included in a neural network and coupling strength parameter information.

Here, for example, the upscaling model 48 receives, as input, the decoded image generated in the step of S302 and the super-resolution processing method data included in the additional data received in the step of S301. Then, the upscaling model 48 outputs the upscaled image obtained by upscaling the decoded image, according to the input. Here, the upscaling model 48 may be a model that uses the deep learning technology. Further, the upscaling model 48 is included in the upscaling section 34, for example.

Figure 17:
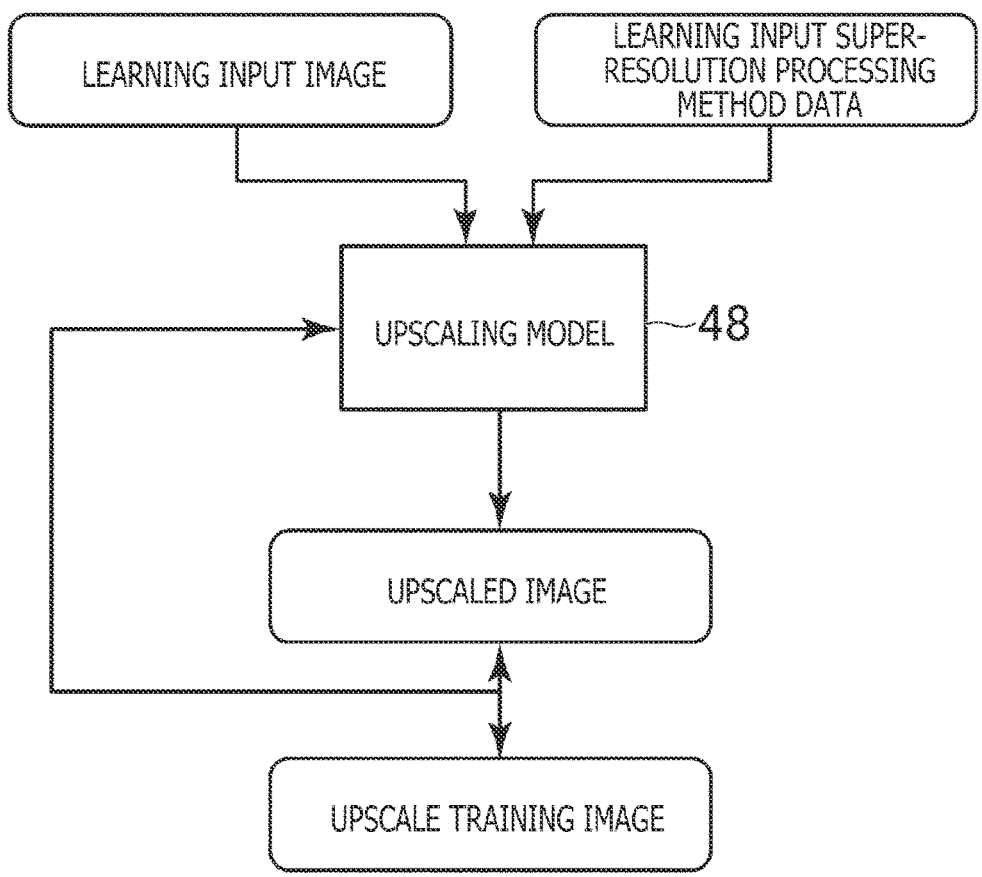
FIG. 17 is a diagram schematically depicting an example of learning performed by the upscaling model indicated in FIG. 16.

FIG. 17 schematically depicts an example of learning performed by the upscaling model 48 indicated in FIG. 16. The upscaling model 48 is trained by use of multiple pieces of learning data, for example. The multiple pieces of learning data include learning input data and an upscale training image, for example. The learning input data includes a learning input image and learning input super-resolution processing method data. The upscale training image is training data to be compared with the upscaled image output from the upscaling model 48.

For example, the learning input image which is a low-resolution image (e.g., 2K image) may be generated by performing the above-described downscaling process, encoding process, and decoding process on a high-resolution image (e.g., 4K image). Then, the learning input super-resolution processing method data which is the super-resolution processing method data corresponding to the high-resolution image may be generated by processes similar to those described above. It is to be noted that, as will be described later, the high-resolution image is used as the upscale training image.

Then, the learning data that includes the learning input data and the upscale training image may be generated. The learning input data includes the above-described learning input image and learning input super-resolution processing method data. The upscale training image is the above-mentioned high-resolution image. The upscaling model 48 may then be trained by supervised learning involving the use of multiple pieces of learning data generated as described above on the basis of numerous high-resolution images. For example, the upscaled image that is output from the upscaling model 48 when the learning input data included in the learning data is input to the upscaling model 48 may be compared with the upscale training image included in the learning data. The upscaling model 48 may then be trained by updating parameters of the upscaling model 48 by the error back-propagation method (back propagation) on the basis of the result of the comparison.

In the present embodiment, the data transmission section 28 may transmit, to the terminal 12, the additional data with higher priority than the image data. For example, the additional data may be transmitted to the terminal 12 with higher priority than the image data by use of QoS (Quality of Service) and priority control technologies. Alternatively, the data transmission section 28 may transmit, to the terminal 12, the feature quantity data with higher priority than the image data.

According to the present embodiment, the upscaled image is generated on the basis of not only the image data transmitted from the cloud server 10 to the terminal 12 but also the additional data transmitted from the cloud server 10 to the terminal 12. The present embodiment thus generates an upscaled image that is more similar to the original image than the upscaled image generated solely from the image data.

It is to be noted that the above-described embodiment is not limitative of the present invention.

For example, as will be explained below, the upscaling section 34 may generate an upscaled image higher in resolution than the downscaled image on the basis of the time series of the image data and the time series of the additional data received by the data reception section 30.

For example, the input determination function dictionary 40 may be implemented by using an RNN (Recurrent Neural Network). In such a case, the upscaling section 34 of the terminal 12 may store the decoded image generated in the step of S202 and the feature quantity data included in the additional data received in the step of S201.

In such a case, in the step of S203, the input determination function dictionary 40 may receive, as input, the time series of the decoded images that include the most recent decoded image and are stored in the upscaling section 34 and the time series of the feature quantity data that includes the most recent feature quantity data. The input determination function dictionary 40 may then output the algorithm data according to the input.

Here, for the training of the input determination function dictionary 40, the time series of the learning input images which are low-resolution images (e.g., 2K images) may be generated by executing the above-described downscaling process, encoding process, and decoding process on each of a series of high-resolution images (e.g., 4K images) (time series of high-resolution images). Then, processes similar to those described above may be performed to generate a time series of the learning input feature quantity data which is a time series of the feature quantity data corresponding to the series of the high-resolution images.

The algorithm training data which is algorithm data suitable for generating the last image in the above series of the high-resolution images from the last image in the time series of the learning input images may then be identified by empirical rules, by visual confirmation by the user, or by experiments involving various types of algorithm data, for example.

Then, the learning data that includes the learning input data and the above-described algorithm training data may be generated. The learning input data includes the time series of the above-described learning input images and the time series of the above-described learning input feature quantity data. The input determination function dictionary 40 may then be trained by supervised learning involving the use of multiple pieces of learning data generated as described above on the basis of the time series of numerous high-resolution images. For example, the algorithm data that is output from the input determination function dictionary 40 when the learning input data included in the learning data is input to the input determination function dictionary 40 may be compared with the algorithm training data included in the learning data. The input determination function dictionary 40 may then be trained by updating parameters of the input determination function dictionary 40 by the error back-propagation method (back propagation) on the basis of the result of the comparison.

As another example, the output generation function dictionary 42 may be implemented by using an RNN. In such a case, the upscaling section 34 of the terminal 12 may store the decoded image generated in the step of S202 and the feature quantity data included in the additional data received in the step of S201.

Also, in such a case, in the step of S204, the output generation function dictionary 42 may receive, as input, the algorithm data generated in the step of S203, the time series of the decoded images that include the most recent decoded image and are stored in the upscaling section 34, and the time series of the feature quantity data including the most recent feature quantity data. The output generation function dictionary 42 may then output the generation parameter data according to the input.

Here, for the training of the output generation function dictionary 42, the time series of the learning input images which are low-resolution images (e.g., 2K images) may be generated by executing the above-described downscaling process, encoding process, and decoding process on each of a series of high-resolution images (e.g., 4K images) (time series of high-resolution images). Then, processes similar to those described above may be performed to generate a time series of the learning input feature quantity data which is a time series of the feature quantity data corresponding to the series of the high-resolution images.

The values of the learning input algorithm data which is algorithm data suitable for generating the last image in the above series of the high-resolution images from the last image in the time series of the learning input images may then be identified by the user by use of empirical rules, visual confirmation, or experiments involving various types of algorithm data, for example. Here, it is to be noted that the output that is output from the input determination function dictionary 40, which is a trained machine learning model, when the time series of the learning input images and the time series of the learning input feature quantity data are input to the input determination function dictionary 40, may be identified as the learning input algorithm data.

The generation parameter training data which is generation parameter data suitable for generating the last image in the above series of the high-resolution images from the last image in the time series of the learning input images may then be identified by empirical rules, by visual confirmation by the user, or by experiments involving various types of generation parameter data, for example.

Then, the learning data that includes the learning input data and the generation parameter training data may be generated. The learning input data includes the above-described learning input algorithm data, the time series of the above-described learning input images, and the time series of the above-described learning input feature quantity data. The output generation function dictionary 42 may then be trained by supervised learning involving the use of multiple pieces of learning data generated as described above on the basis of the time series of numerous high-resolution images. For example, the generation parameter data that is output from the output generation function dictionary 42 when the learning input data included in the learning data is input to the output generation function dictionary 42 may be compared with the generation parameter training data included in the learning data. The output generation function dictionary 42 may then be trained by updating parameters of the output generation function dictionary 42 by the error back-propagation method (back propagation) on the basis of the result of the comparison.

As another example, the upscaling model 44 may be implemented by using an RNN. In such a case, the upscaling section 34 of the terminal 12 may store the decoded image generated in the step of S302 and the feature quantity data included in the additional data received in the step of S301.

Also, in such a case, in the step of S303, the upscaling model 44 may receive, as input, the time series of the decoded images including the most recent decoded image and the time series of the feature quantity data including the most recent feature quantity data. Then, the upscaling model 44 may output the upscaled image according to the input.

Here, for the training of the upscaling model 44, the time series of the learning input images which are low-resolution images (e.g., 2K images) may be generated by executing the above-described downscaling process, encoding process, and decoding process on each of a series of high-resolution images (e.g., 4K images) (time series of high-resolution images). Then, processes similar to those described above may be performed to generate a time series of the learning input feature quantity data which is a time series of the feature quantity data corresponding to the series of the high-resolution images.

Then, the learning data that includes the learning input data and the upscale training image may be generated. The learning input data includes the time series of the above-described learning input images and the time series of the above-described learning input feature quantity data. The upscale training image is the last image in the above-described series of the high-resolution images. Then, the upscaling model 44 may be trained by supervised learning involving the use of multiple pieces of learning data generated as described above on the basis of the time series of numerous high-resolution images. For example, the upscaled image that is output from the upscaling model 44 when the learning input data included in the learning data is input to the upscaling model 44 may be compared with the upscale training image included in the learning data. The upscaling model 44 may then be trained by updating parameters of the upscaling model 44 by the error back-propagation method (back propagation) on the basis of the result of the comparison.

As another example, the super-resolution processing method data generation model 46 may be implemented by using an RNN. In such a case, the super-resolution processing method data generation model 46 may store the feature quantity data generated by the feature quantity data generation section 26*a*.

Also, in such a case, the super-resolution processing method data generation model 46 may receive, as input, the time series of the feature quantity data including the most recent feature quantity data. The super-resolution processing method data generation model 46 may then output the super-resolution processing method data according to the input.

Here, for the training of the super-resolution processing method data generation model 46, the time series of the learning input images which are low-resolution images (e.g., 2K images) may be generated by executing the above-described downscaling process, encoding process, and decoding process on each of a series of high-resolution images (e.g., 4K images) (time series of high-resolution images). Then, processes similar to those described above may be performed to generate a time series of the learning input feature quantity data which is a time series of the feature quantity data corresponding to the series of the high-resolution images.

The values of the super-resolution processing method training data which is super-resolution processing method data suitable for generating the last image in the series of the high-resolution images from the last image in the time series of the learning input images may then be identified by the user by use of empirical rules, visual confirmation, or experiments involving various types of super-resolution processing method data, for example.

Then, the learning data that includes the learning input data and the super-resolution processing method training data may be generated. The learning input data includes the time series of the above-described learning input feature quantity data. The super-resolution processing method data generation model 46 may be trained by supervised learning involving the use of multiple pieces of learning data generated as described above on the basis of the time series of numerous high-resolution images. For example, the super-resolution processing method data that is output from the super-resolution processing method data generation model 46 when the learning input data included in the learning data is input to the super-resolution processing method data generation model 46 may be compared with the super-resolution processing method training data included in the learning data. The super-resolution processing method data generation model 46 may then be trained by updating parameters of the super-resolution processing method data generation model 46 by the error back-propagation method (back propagation) on the basis of the result of the comparison.

As another example, the upscaling model 48 may be implemented by using an RNN. In such a case, the upscaling section 34 of the terminal 12 may store the decoded image generated in the step of S302 and the super-resolution processing method data included in the additional data received in the step of S301.

Also, in such a case, the upscaling model 48 may receive, as input, the time series of the decoded images including the most recent decoded image and the time series of the super-resolution processing method data including the most recent super-resolution processing method data. Then, the upscaling model 48 may output the upscaled image obtained by upscaling the decoded image, according to the input.

Here, for the training of the upscaling model 48, the time series of the learning input images which are low-resolution images (e.g., 2K images) may be generated by executing the above-described downscaling process, encoding process, and decoding process on each of a series of high-resolution images (e.g., 4K images) (time series of high-resolution images). Then, processes similar to those described above may be performed to generate a time series of the learning input super-resolution processing method data which is a time series of the super-resolution processing method data corresponding to the series of the high-resolution images.

Then, the learning data that includes the learning input data and the upscale training image may be generated. The learning input data includes the time series of the above-described learning input images and the time series of the above-described learning input super-resolution processing method data. The upscale training image is the last image in the series of the above-described high-resolution images. Then, the upscaling model 48 may be trained by supervised learning involving the use of multiple pieces of learning data generated as described above on the basis of the time series of numerous high-resolution images. For example, the upscaled image that is output from the upscaling model 48 when the learning input data included in the learning data is input to the upscaling model 48 may be compared with the upscale training image included in the learning data. The upscaling model 48 may then be trained by updating parameters of the upscaling model 48 by the error back-propagation method (back propagation) on the basis of the result of the comparison.

As described above, the present embodiment uses a machine learning model to which the time series of data is input, causing the machine learning model to output the data provided with changes predicted to occur in the current frame on the basis of the time series of past frame data. This further improves the accuracy of the result output from the machine learning model.

Also, in the present embodiment, the input determination function dictionary 40 may be implemented by using a GAN (Generative Adversarial Network), for example. As another example, the output generation function dictionary 42 may be implemented by using a GAN. As a further example, the upscaling model 44 may be implemented by using a GAN. As an even further example, the super-resolution processing method data generation model 46 may be implemented by using a GAN. As a still further example, the upscaling model 48 may be implemented by using a GAN.

As another example, by using methods different from those described above, the upscaling section 34 may generate the upscaled image on the basis of the image data and additional data. For example, the upscaling section 34 may store a suitable table associating the values of the additional data with the values of the data indicative of types of algorithm for super-resolution processing. In reference to the table, the upscaling section 34 may identify the type of super-resolution processing on the basis of the values of the additional data. The upscaling section 34 may then execute the above-described upscaling process by carrying out super-resolution processing of the identified type.

As another example, the upscaling section 34 of the terminal 12 may determine whether or not to execute super-resolution processing, on the basis of the data that is included in the feature quantity data and indicates whether or not it is necessary to perform super-resolution processing. Alternatively, the upscaling section 34 of the terminal 12 may determine whether or not to execute super-resolution processing, on the basis of the data that is included in the generated algorithm data and indicates whether or not it is necessary to carry out super-resolution processing. In the case where it is determined that super-resolution processing is not to be executed, the display control section 36 may cause the display section 12f to display the decoded image without carrying out the upscaling process by the upscaling section 34.

As another example, a play image yet to be downscaled may be divided into multiple partial images. Here, the play image may be divided into multiple partial images each occupying a rectangular region having a size of 8×8 pixels or 32×32 pixels, for example. As a further example, the play image may be divided horizontally into slice-shaped (i.e., stripe-shaped) multiple partial images each bundling multiple lines (e.g., 32 lines) together. In such a case, the partial images correspond to the above-mentioned original image. The series of the steps of S102 to S105 in FIG. 4 and steps of S201 to S206 in FIG. 5 may be executed on the original image represented by the partial images. Alternatively, the series of the steps of S102 to S105 in FIG. 4 and steps of S301 to S304 in FIG. 10 may be carried out on the original image represented by the partial images.

Regardless of whether the original image corresponds to the play image or to the partial images, the steps of S203 and S204 may be performed with a smaller granularity than that of the original image. For example, the steps of S203 and S204 may be executed on each image with the size of 8×8 pixels or 32×32 pixels. Here, in the case where the decoded image has a resolution of 1920×1088 pixels and where the steps of S203 and S204 are carried out on each image with the size of 32×32 pixels, the steps of S203 and S204 are to be performed 60×24 times. In such a case, the learning input image used for the training of the input determination function dictionary 40 and of the output generation function dictionary 42 may be an image having the same shape and the same size as those of the image used in the steps of S203 and S204.

Also, regardless of whether the original image corresponds to the play image or to the partial images, the step of S303 may be performed with a smaller granularity than that of the original image. For example, the step of S303 may be executed on each image with the size of 8×8 pixels or 32×32 pixels. Here, in the case where the decoded image has a resolution of 1920×1088 pixels and where the step of S303 is to be carried out on each image with the size of 32×32 pixels, the step of S303 is to be performed 60×24 times. In such a case, the learning input image used for the training of the upscaling model 44 may be an image having the same shape and the same size as those of the image used in the step of S303.

The various types of machine learning models described above may continuously be updated as needed by offline learning.

The applicable scope of the present invention is not limited to the situations in which the cloud gaming service is provided. The present invention may generally be applied to any situation where an image transmission apparatus corresponding to the cloud server 10 transmits a downscaled image derived from the original image and where the downscaled image is received by an image reception apparatus corresponding to the terminal 12.

Here, the cloud server 10 may repetitively transmit image data and additional data to a distribution server distributing moving images representing the play status of games, for example. Then, the distribution server may store the image data and the additional data in such a manner that the image data and the additional data correspond to a series of play images and are associated with one another in sequence. After receiving a request from the terminal of a user viewing the moving images representing the play status of a game, the distribution server may successively transmit, to the terminal, the stored image data and additional data in the associated order. The terminal may then execute processes similar to those carried out by the terminal 12 depicted in FIG. 1.

Further, in a situation where a game is broadcast live, upon receiving image data and additional data, the above-mentioned distribution server may transmit, on a real time basis, the received image data and additional data to the terminal of the user viewing the moving images representing the play status of the game involved. Then, the terminal may perform processes similar to those carried out by the terminal 12 in FIG. 1.

Here, the cloud server 10 may double as the above-mentioned distribution server transmitting the image data and the additional data to the terminal. Alternatively, the terminal 12 may perform processes similar to those of the cloud server 10 in FIG. 1 so as to repetitively transmit, to the distribution server, the image data and the additional data corresponding to a series of play images.

It is to be noted that specific character strings and numerical values in the foregoing description as well as in the accompanying drawings are only examples and are not limitative of the present invention.

The invention claimed is:

1. An image transmission/reception system comprising:
an image transmission apparatus; and
an image reception apparatus, wherein
the image transmission apparatus includes
an image data generation section configured to generate image data representing a downscaled image obtained by downscaling an original image,
an additional data generation section configured to generate additional data on a basis of the original image, the additional data including a feature amount of the original image and a feature amount that is a parameter used for encoding the downscaled image, the parameter being unidentifiable by the image data alone, and
a data transmission section configured to transmit the image data and the additional data, and
the image reception apparatus includes
a data reception section configured to receive the image data and the additional data,
an upscaling section configured to generate an upscaled image on a basis of the image data and the additional data, the upscaled image being higher in resolution than the downscaled image, and
a display control section configured to cause the upscaled image to be displayed,
wherein the additional data generation section is configured to determine whether or not it is necessary to perform super-resolution processing on the downscaled image, on the basis of the feature amounts,
wherein the additional data includes data indicating the determination, and
wherein the upscaling section generates algorithm data indicative of whether an image decoded from the received image data is suitable for super-resolution, and the algorithm data is generated on the basis of the decoded image and feature quantity data of the additional data, using an input determination function dictionary.

2. The image transmission/reception system according to claim 1, wherein
the additional data generation section includes a feature quantity data generation section configured to generate feature quantity data indicative of at least either a feature quantity of the original image or a feature quantity that is a parameter used for encoding the downscaled image,
the data transmission section transmits the additional data including the feature quantity data, and
the upscaling section generates the upscaled image on a basis of the image data and the feature quantity data.

3. The image transmission/reception system according to claim 1, wherein
the additional data generation section includes a feature quantity data generation section and a super-resolution processing method data generation section, the feature quantity data generation section being configured to generate feature quantity data indicative of at least either a feature quantity of the original image or a feature quantity that is a parameter used for encoding the downscaled image, the super-resolution processing method data generation section being configured to generate super-resolution processing method data including a parameter for use in super-resolution processing on a basis of the feature quantity data,
the data transmission section transmits the additional data including the super-resolution processing method data, and
the upscaling section generates the upscaled image on a basis of the image data and the super-resolution processing method data.

4. The image transmission/reception system according to claim 3, wherein the upscaling section includes a trained machine learning model configured to output the upscaled image upon receiving, as input, the super-resolution processing method data and an image generated on a basis of the image data.

5. The image transmission/reception system according to claim 1, wherein the data transmission section transmits, to the image reception apparatus, the additional data with higher priority than the image data.

6. The image transmission/reception system according to claim 1, wherein the upscaling section generates the upscaled image on a basis of a time series of the image data and a time series of the additional data, the upscaled image being higher in resolution than the downscaled image.

7. An image transmission apparatus comprising:
an image data generation section configured to generate image data representing a downscaled image obtained by downscaling an original image;
an additional data generation section configured to generate additional data on a basis of the original image, the additional data including a feature amount of the original image and a feature amount that is a parameter used for encoding the downscaled image, the parameter being unidentifiable by the image data alone; and
a data transmission section configured to transmit the image data and the additional data to an image reception apparatus including an upscaling section and a display control section, the upscaling section being configured to generate an upscaled image on a basis of the image data and the additional data, the upscaled image being higher in resolution than the downscaled image, the display control section being configured to cause the upscaled image to be displayed,
wherein the additional data generation section is configured to determine whether or not it is necessary to perform super-resolution processing on the downscaled image, on the basis of the feature amounts,
wherein the additional data includes data indicating the determination, and
wherein the upscaling section generates algorithm data indicative of whether an image decoded from the received image data is suitable for super-resolution, and the algorithm data is generated on the basis of the decoded image and feature quantity data of the additional data, using an input determination function dictionary.

8. An image reception apparatus comprising:
a data reception section configured to receive image data and additional data from an image transmission apparatus including an image data generation section, an additional data generation section, and a data transmission section, the image data generation section being configured to generate the image data representing a downscaled image obtained by downscaling an original image, the additional data generation section being configured to generate the additional data on a basis of the original image, the additional data including a feature amount of the original image and a feature amount that is a parameter used for encoding the downscaled image, the parameter being unidentifiable by the image data alone, the data transmission section being configured to transmit the image data and the additional data;

an upscaling section configured to generate an upscaled image on a basis of the image data and the additional data, the upscaled image being higher in resolution than the downscaled image; and a display control section configured to cause the upscaled image to be displayed, wherein the additional data generation section is configured to determine whether or not it is necessary to perform super-resolution processing on the downscaled image, on the basis of the feature amounts, wherein the additional data includes data indicating the determination, and wherein the upscaling section generates algorithm data indicative of whether an image decoded from the received image data is suitable for super-resolution, and the algorithm data is generated on the basis of the decoded image and feature quantity data of the additional data, using an input determination function dictionary.

9. An image transmission/reception method comprising:
causing an image transmission apparatus to generate image data representing a downscaled image obtained by downscaling an original image;
causing the image transmission apparatus to generate additional data on a basis of the original image, the additional data including a feature amount of the original image and a feature amount that is a parameter used for encoding the downscaled image, the parameter being unidentifiable by the image data alone;
causing the image transmission apparatus to transmit the image data and the additional data;
causing an image reception apparatus to receive the image data and the additional data;
causing the image reception apparatus to generate an upscaled image on a basis of the image data and the additional data, the upscaled image being higher in resolution than the downscaled image; and
causing the image reception apparatus to cause the upscaled image to be displayed,
wherein an additional data generation section is configured to determine whether or not it is necessary to perform super-resolution processing on the downscaled image, on the basis of the feature amounts,
wherein the additional data includes data indicating the determination, and
wherein algorithm data is generated indicative of whether an image decoded from the received image data is suitable for super-resolution, and the algorithm data is generated on the basis of the decoded image and feature quantity data of the additional data, using an input determination function dictionary.

10. A non-transitory, computer-readable storage medium containing a computer program, which when executed by a computer, causes the computer to perform an image generation and transmission method by carrying out actions, comprising:

generating image data representing a downscaled image obtained by downscaling an original image;
generating additional data on a basis of the original image, the additional data including a feature amount of the original image and a feature amount that is a parameter used for encoding the downscaled image, the parameter being unidentifiable by the image data alone; and
transmitting the image data and the additional data to an image reception apparatus including an upscaling section and a display control section, the upscaling section being configured to generate an upscaled image on a basis of the image data and the additional data, the upscaled image being higher in resolution than the downscaled image, the display control section being configured to cause the upscaled image to be displayed,
wherein an additional data generation section is configured to determine whether or not it is necessary to perform super-resolution processing on the downscaled image, on the basis of the feature amounts, and
wherein the additional data includes data indicating the determination, and
wherein the upscaling section generates algorithm data indicative of whether an image decoded from the received image data is suitable for super-resolution, and the algorithm data is generated on the basis of the decoded image and feature quantity data of the additional data, using an input determination function dictionary.

11. A non-transitory, computer-readable storage medium containing a computer program, which when executed by a computer, causes the computer to perform an image reception method by carrying out actions, comprising:
receiving image data and additional data from an image transmission apparatus including an image data generation section, an additional data generation section, and a data transmission section, the image data generation section being configured to generate the image data representing a downscaled image obtained by downscaling an original image, the additional data generation section being configured to generate the additional data on a basis of the original image, the additional data including a feature amount of the original image and a feature amount that is a parameter used for encoding the downscaled image, the parameter being unidentifiable by the image data alone, the data transmission section being configured to transmit the image data and the additional data;
generating an upscaled image on a basis of the image data and the additional data, the upscaled image being higher in resolution than the downscaled image; and
causing the upscaled image to be displayed,
wherein the additional data generation section is configured to determine whether or not it is necessary to perform super-resolution processing on the downscaled image, on the basis of the feature amounts,
wherein the additional data includes data indicating the determination, and
wherein algorithm data is generated indicative of whether an image decoded from the received image data is suitable for super-resolution, and the algorithm data is generated on the basis of the decoded image and feature quantity data of the additional data, using an input determination function dictionary.

* * * * *